Jan. 10, 1956  J. O. SARTO  2,730,167
CONTROL APPARATUS
Filed March 8, 1950  2 Sheets-Sheet 2

INVENTOR.
Jorma O. Sarto.
BY
Harness and Harris
ATTORNEYS.

United States Patent Office 2,730,167
Patented Jan. 10, 1956

2,730,167

CONTROL APPARATUS

Jorma O. Sarto, Walled Lake, Mich., assignor to Chrysler Corporation, Highland Park, Mich., a corporation of Delaware Application March 8, 1950, Serial No. 148,322

5 Claims. (Cl. 158—36.4)

The present invention relates to control apparatus for use with fluid nozzles, and more particularly to apparatus for controlling the flow of fuel to or from fluid nozzles of the return-flow type.

It is known behavior characteristic of return-flow nozzles that under conditions of constant pressure of supply, the total flow, which may be defined as the flow of all fuel to the nozzles regardless of whether it is ejected, by-passed at the nozzles, or both, suffers a decrease when the back pressure in the return-flow line is caused to increase. Simultaneously with the increase in back pressure, there is a gain in the ejected output of the nozzle assuming that the pressure of supply remains constant. The difference between the total flow and the ejected output just noted is, of course, the quantity of the bypassed fluid. It follows then that under conditions of constant pressure of supply, a change of back pressure on the nozzle is doubly reflected in change of the rate of flow of fluid by-passed. That is to say, a relatively slight change in back pressure on a return flow nozzle may result in a noticeable corresponding change in the rate of flow of bypassed fluid owing to a decreased rate of total flow, which constitutes the immediate source of the bypassed fluid, and owing further to an increased rate of the ejected output made necessarily at the expense of the bypass rate of flow.

According to a feature of the present invention, the fact that the back pressure is readily controlled and capable of exerting a wide influence over the bypass rate of flow is utilized to prevent any unnecessary accumulation of bypassed fluid in the immediate fluid supply for the nozzles. Conversely any starvation effect for lack of fluid at the immediate fluid supply for the nozzles is prevented by appropriate changes in the back pressure maintained at the nozzles.

According to a further feature of the invention, there is provided a relatively simple device sensitive to a relative accumulation or scarcity of return flow fluid, which device automatically varies the back pressure on the fluid nozzles for making speedy compensation in rate of bypass flow of fluid.

According to another feature, a substantial flow of by-passed fluid is maintained through the return flow type nozzle of the apparatus for cooling purposes at all times in absence of a supply of fresh fluid being received by the nozzle at an accelerated rate during certain phases of operation.

According to yet another feature is the provision of a circulating fuel system in which no accumulator or sump is necessary for accommodating fluctuating quantities of excess circulating fluid and from which fluid is expelled substantially at the same rate as it is received. That is to say, the circulating path proper is supplied with fresh fuel from a fuel source through a single metering device and once it is supplied, the fuel is neither returned to the source nor allowed to accumulate in the circulating path proper. When there does exist a tendency for fuel to accumulate in the circulating path proper, the resulting pressure fluid build-ups in the present improved system cause correspondingly high rates of discharge from the circulating path proper and thereby eliminate the need for facilities for returning or otherwise accumulating the excessive fuel. The single metering device can hence be geared as desired for actuation by fuel/air ratio regulating elements which then have entire control over the instantaneous net amount of fuel actually being handled by the circulating path proper for discharge purposes.

According to still a further feature of the invention there is provided a restrictive device requiring only one movable component and which is readily adjustable to maintain a steep pressure gradient of an appropriate value and which is simply actuated for automatic operation.

Further features, objects, and advantages will either be specifically pointed out or become apparent when, for a better understanding of the invention, reference is made to the following written description taken in conjunction with the accompanying drawings wherein.

Figure 1:
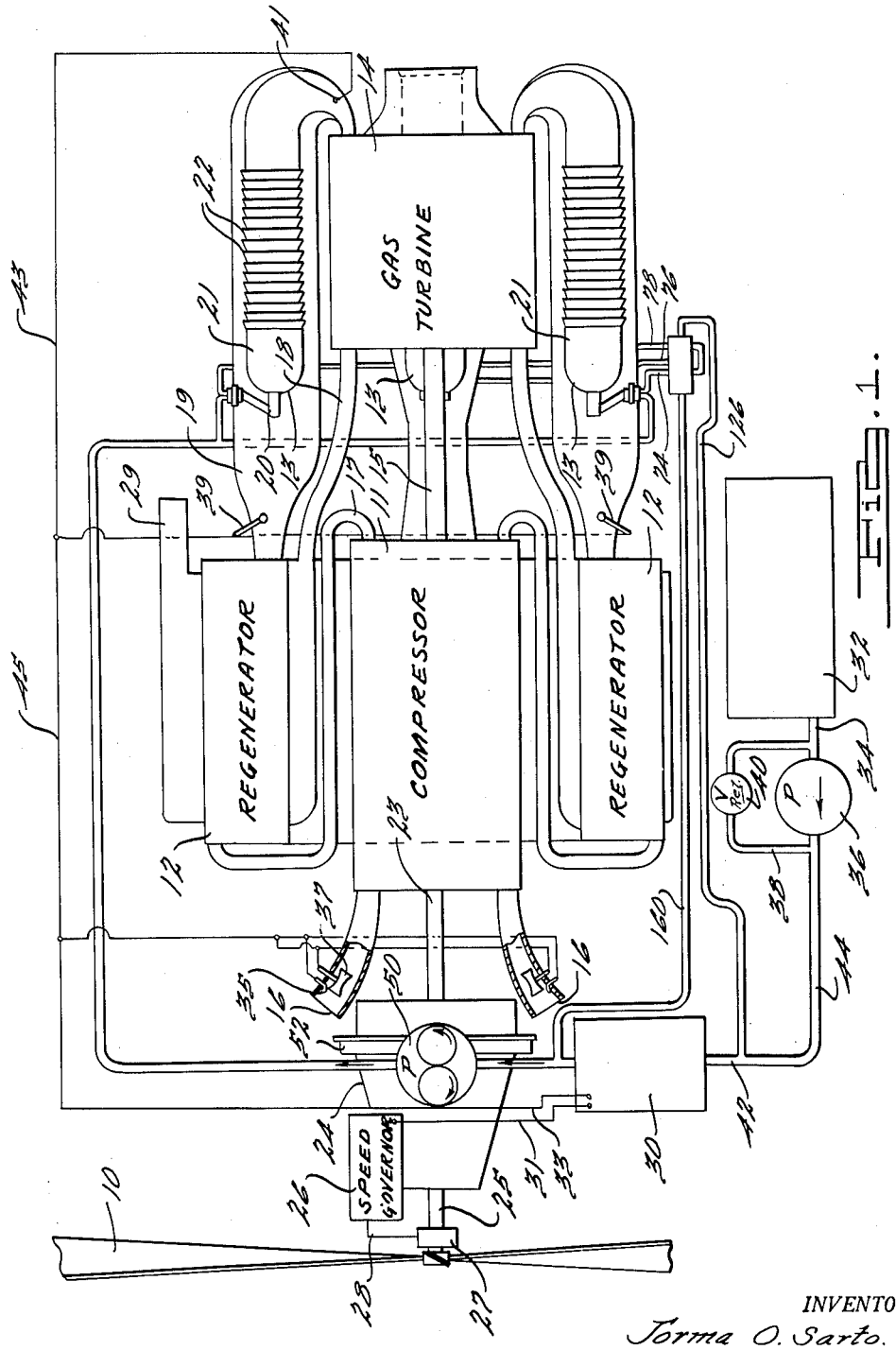
Figure 1 is a partially diagrammatic view showing a power plant including a gas turbine to which the control apparatus of the present invention is applied.
Figures 2, 3:
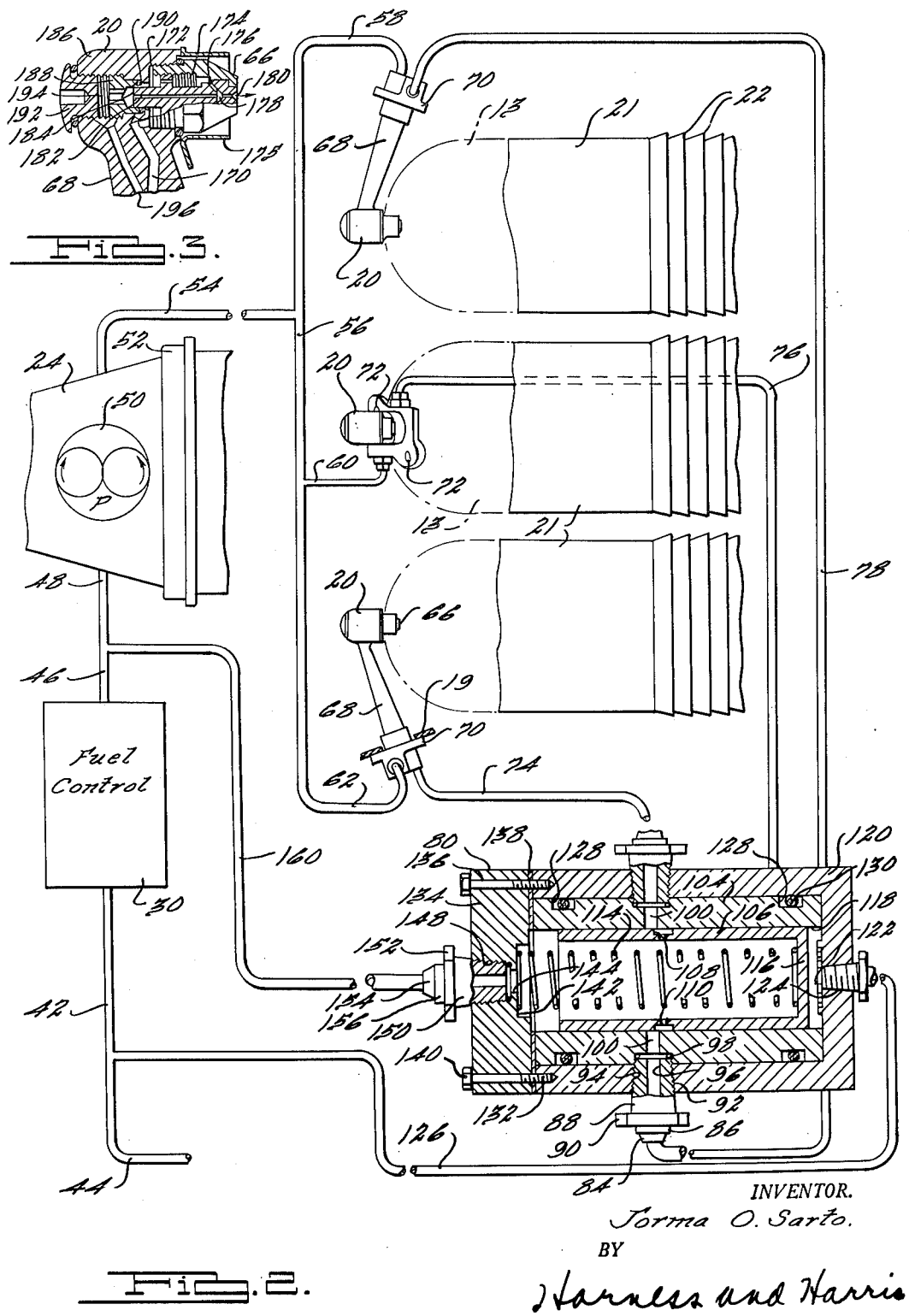
Figure 2 is a view partially in section of certain essential parts of the fuel system of Figure 1.
Figure 3 is a fragmentary sectional view of a typical return-flow nozzle.

In Figures 1 and 2, the fuel system shown is adapted for use with a power plant for driving a load such as a propeller 10 for piloted aircraft. The power plant may comprise a compressor 11, a regenerator 12 surrounding the compressor, a plurality of burners 13, and a gas turbine 14. The gas turbine 14 may be driven by hot gases produced by the combustion of fuel and air in the burners 13 to drive compressor 11 through appropriate connecting means represented by the reference character 15. The compressor 11, which may be of the axial type, draws in air at its left end through scoops 16. Compressed air is delivered from the right end of the compressor 11 into conduit means 17, which leads the compressed air to the regenerator 12. The compressed air may follow a zigzag path through the regenerator 12 and thereby be heated by exhaust gases passing from the gas turbine 14 through conduit means 18 to the regenerator 12 and out through exhaust stack 29. Heated compressed air passes from regenerator 12 through conduit means 19 which encloses the burners 13. Each burner may be formed of a fuel nozzle 20 and an air tube 21 formed in its intermediate portion of nested frustum-like sections 22 which permit the air to pass through the tube wall to the nozzles 20. Tubes 21 are curved at their ends to direct the streams of hot gases formed in the burner 13 toward the end of the gas turbine 14, which is positioned within burners 13. For a more complete showing of the arrangement of compressor, regenerator, burners, and gas turbine, reference may be made to the copending application of Staley and Williams, Serial No. 715,840, filed December 12, 1946, now Patent No. 2,631,430 which is assigned to the assignee of the present application. For a more complete showing of the burner tubes 21 with frustum-like sections 22, reference may be made to the copending application of Samuel B. Williams, Serial No. 715,873, filed December 12, 1946, now Patent No. 2,603,064 which is assigned to the assignee of the present application.

The compressor 11, which has been previously described as being driven from gas turbine 14 through means 15, is drivingly connected by means 23 with a propeller reduction drive 24, which in turn drives the shaft 25 on which the propeller 10 is mounted. Thus the propeller 10 may be driven from the gas turbine 14 at a reduced speed. A propeller speed governor 26, which includes parts responsive to the speed of the propeller 10, is diagrammatically illustrated as regulating the propeller pitch control means 27 through a connection 28. The speed governor 26 has a speed setting adjustment, not shown, under direct control of the pilot and adjustable to different settings as called for in operation. A lead 31 from the propeller speed governor 26 serves to communicate speed signals therefrom appropriately to a fuel metering device 30. Fuel metering device 30 represents a portion of a liquid fuel system of which container 32 constitutes the fluid source. By means of an outlet conduit 34 from container 32 a fluid transfer pump 36 is able to withdraw fluid and transmit it into supply conduit 44. A suitable bypass line 38 having a relief valve 40 is provided for pump 36 in order to accurately control the supply pressure maintained in supply conduit 44. Flow received by a fluid conduit 42, representing the inlet for metering device 30, is furnished by supply conduit 44.

Illustrated diagrammatically at 33 is a signal transmitting means for the metering device 30 over which signals are transmitted from remote reading sensing devices located strategically about the power plant. Each air scoop 16 carries conventional sensing elements 35 and 37 for measuring the rate of airflow through the scoop. The air pressures acting upon these elements are transmitted through means 33 for appropriate reception and response by metering device 30. In conduit means 19 there may be positioned a plurality of elements 39 responsive to the temperature of the air passing from regenerator 12 to burners 13. The signal from elements 39 may be communicated through means 45 and 33 to metering device 30.

Adjacent the inlet to gas turbine 14 is a temperature-responsive element 41, which measures the temperature of the gases entering the turbine. Temperature element 41 acts through a means diagrammatically illustrated by line 43 leading to means 45 and 33 to modify the air pressures transmitted from the air-measuring elements 41 and 42 in the air scoop 16. For a more complete explanation of the interrelated operation of the sensing device set forth above, reference may be made to the copending application of Paul W. Wyckoff, Serial No. 763,467, filed July 25, 1947, now Patent No. 2,599,507 which is assigned to the assignee of the present application.

The pressure in inlet conduit 42 to the metering device 30 may be accurately maintained at a value of approximately 45 p. s. i. Outlet 46 for metering device 30 tends normally to be maintained at a pressure of approximately 25 p. s. i., and communicates with the intake 48 of main fuel pump means 50.

Pump means 50 may conveniently be located on gear reduction drive 24 upon or adjacent an accessory case 52 which has available to it a proper gearing taken off from the main drive of the power plant. Pump means 50, which may be hence of variable speed operation, has a delivery outlet 54 in which it may maintain a discharge pressure of the order of 400 p. s. i.

The flow of fluid passing through conduit 54 is divided by a conduit 56 and passes through parallel conduits 58, 60, and 62 which supply individual nozzles 20. Each nozzle 20 has a spray tip 66 from which is delivered the ejected output of the nozzle. The shank 68 of the nozzle holder is supported by a base 70. Suitable fastening apertures 72 are formed in base 70 for appropriate attachment of the latter to the structure associated with conduit means 19. Nozzles 20, which may be of the by-pass or return-flow type, are served by bypass lines 74, 76, and 78 respectively.

The fluid conducted through these bypass lines is brought together by a common regulating device shown at 80. The bypass pressure individually maintained in bypass lines 74, 76, and 78 may average to be of the order of 190 p. s. i. The attachment of bypass conduit 78 to regulating device 80 is representative of the attachment for the other bypass lines and will be described as typical. A coupling comprised by parts 84 and 86 serves to attach bypass 78 to a fitting 88 adjacent a polygonal flange 90 formed on the latter. Fitting 88 is provided with a threaded portion 92 threadedly received in an opening 94 formed in device 80. One or more of these fittings 88 may be disposed about regulating device 80, each serving to handle the flow of one or more nozzles. The seal 98 disposed between fitting 88 and the structure of regulating device 80 serves to provide a fluid-tight seal between the joint, at which opening 96 of fitting 88 registers with a companion opening 100 formed in the structure of regulating device 80. One or more of these radiating openings 100 are formed in spacing circumferentially about metering device 80 in a sleeve member 104 which constitutes a valve body part of regulating device 80. Received and movable within body part 104 is a valve part 106 formed with an external annular recess 108 which cooperates with the radiating openings 100 just described to restrict and regulate flow of fluid.

One or more openings 110 are spaced around valve part 106 to provide communication between annular recess 108 on valve part 106 and the interior of valve part 106. The interior chamber may be occupied by a resilient member 114, which may be a spring. An end of member 114 engages an end wall 116 of valve part 106. Sleeve member 104 has chamber walls 118, adjacent to the outer walls of the valve port 106. Spacing lugs 122 are carried by a casing 120 to cooperate with end wall 116 of the valve part 106. A fitting 124 is received in casing 120 and conveniently surrounded by lugs 122 for unobstructedly transmitting fluid pressure between the chamber occupied by lugs 122 and a conduit 126 which communicates with the supply conduit 44 and fluid inlet 42 to the fuel metering control 30.

Sleeve member 104 has annular grooves 128 adjacent its ends in which are received suitable ring seals 130 for effecting a fluid-tight seal between member 104 and casing 120. Tapped bores 132 are provided at one end of casing 120 for registration with smooth bores 136 formed in a cover 134. A suitable gasket 138 is located between cover 134 and casing 120, and fasteners 140 are employed in bores 132 and 136 to effect a seal between the parts mentioned. A seat 142 is formed in cover 134 in which is received the resilient member 114. Centrally of seat 142, cover 134 has an opening 144 leading outwardly to a fitting 150 which is threadably received in an opening 148 formed in cover 134. Fitting 150 is provided with a polygonal flange 152 in adjacency to which is received a coupling comprising parts 154 and 156 attached to a conduit 160. Conduit 160 communicates with the inlet 48 for the main fuel pump and serves to supplement the fuel flow coming from metering device 30 and its discharge line 46.

Referring to Figure 3, it is seen that the return flow nozzle 20 has an inlet 170 which traverses the shank 68 of the nozzle holder. Inlet 170 feeds into an annular recess 172 formed in the nozzle holder proper 186. Fluid is conducted forwardly toward the spray head from cavity 172 through a chamber 174 and led into one or more tangential swirl passages 176. Swirl passages 176 deliver fluid into a swirl chamber 178 from which a portion of the fluid is ejected through an ejection orifice 180 formed in an insert received in spray head 66. A hood 175 may be provided for disposition about the forward part and tip of the nozzle. Behind swirl chamber 178 is located a return-flow passage 182 which passes fluid axially through a sleeve member 184 toward the rear of nozzle holder 186. A sealing element 190 may be provided between an internal shoulder on holder 186 and a packing gland 188 for insuring a seal between sleeve member 184 and holder 186. Cap 192 is threadably received in holder 186 and is removable to provide access for adjustment and removal of packing gland 188 by an appropriate tool. Cap 192 serves to seal off the end of fluid-collecting chamber 194 which supplies a return-flow path 196 for fluid passed down the shank of the nozzle holder and into the bypass conduit 74 of the fuel system.

It will be at once apparent that the total flow of fluid to the nozzle is there divided up into parts constituting ejected output and bypass flow. That is, all fluid handled by the nozzle is destined for one or a combination of both of two uses, namely, use in producing fuel spray or use in cooling the nozzle and thereafter being returned as bypassed fuel. Stated in another way then, the control parameters for the volume of bypass flow are respectively the total flow and the ejected output, since the difference between the latter two quantities represents the volume of bypass or return flow. The performance characteristics of a return-flow nozzle are observed to follow the pattern that under circumstances of the supply pressure being held constant, the total flow decreases with increase of back pressure in the return flow line of the nozzle; further, the ejected output increases with increase of back pressure as aforesaid, supply pressure still being held constant. The consequence, as has been previously noted, is that change of back pressure, say an increase, is reflected by a two-fold mutually contributive change in the bypass flow, namely, that the total flow decreases thus decreasing the total fluid supply available for all purposes, and the ejected output increases and directly at the expense of the volume of flow remaining to be bypassed. An extensive and rapidly responsive control may hence be afforded over the rate of the return flow of fluid from the nozzles by a mere relative change in the return flow back pressure. Accurately adjustable changes in the back pressure are such as to be readily accomplished by slight movement of a comparatively simple valve mechanism in such a manner as is to follow.

The operation of the apparatus thus far described will now be set forth. Fuel travels from the container 32 through transfer pump 36 into the metering device 30. The metering device 30 is adapted to interrelate the speed signal from device 26, the air signals from devices 35 and 37, and the temperature signals from devices 39 and 41 and make appropriate changes in the rate of metering to compensate for changing conditions of operation of the power plant. The reference pressure maintained accurately in conduits 42 and 44 by relief valve 40, is communicated to one end of the regulating device 80 through conduit 126. Metering device 30 meters the fuel supplied it through conduits 44 and 42 and passes the metered fluid through conduit 46 to intake 48 for main pump 50. Additional flow of bypass fuel is received in intake 48 from the bypass conduit 160 supplied by regulating device 80. Main pump means 50 serves to increase the pressure of the fuel to a high value suitable for consumption by nozzles 20.

The average equivalent flow of fluid ejected from nozzles 20 will be equal in amount to the supply of fresh fluid delivered through conduit 46 by metering device 30. The closed bypass fluid circuit, which passes through regulating device 80 for re-introduction of bypassed fluid to the intake 48 of pump means 50, is arranged to cause the bypass fluid to be mixed with the fresh and presumably cooler fluid delivered by conduit 46 of metering device 30. From nozzles 20, across which the pressure drop is such as to render the average bypass fluid pressure approximately equal to 190 p. s. i., the fluid continually being returned is conducted first to regulating device 80.

The restriction afforded by the relative registration of openings 100 formed in sleeve member 104 and annular groove 108 formed in valving part 106 is such as to maintain a steep pressure gradient between the group of bypass lines 74, 76, and 78 and the conduit 160, which communicates with discharge conduit 46 of the fuel metering control. The outlet pressure of fuel metering control 30 is advantageously kept within fairly close range of a predetermined value since excessive pressures would tend to have a damaging effect on the internal mechanism of the metering control. The pressure communicated to the interior of device 80 will be roughly equal to 25 p. s. i., whereas the pressure communicated to the closed end 116 of valve part 106 through conduit 126 may be of the order of 45 p. s. i., the difference in the forces involved will be accommodated by the resilient member 114.

Without considering in detail the effect of such variables as pump speed decreases and control rate increases, they are effective to cause the bypass fluid in conduit 160 to pile up at the intake of the fuel pump means 50 which results in a pressure rise which will be communicated back through conduit 160 to the interior of the regulating device 80 and cause the valve part 106 to move to the right. The relative positioning between annular groove 108 and openings 100 will be changed thereby further restricting the flow of bypassed fluid so as to cause an increase in the back pressure in bypass conduits 74, 76, and 78 from the nozzles.

As previously explained in preceding paragraphs, a change in nozzle back pressure will be doubly reflected in the amount of change in the rate of bypass flow and accordingly, this piling up of the bypass flow at the inlet of pump means 50 will rapidly be remedied. Let it be assumed that fuel metering device 30 is operated so that a reduced flow of fresh fluid is passed through its outlet 46. Such a reduction in flow can be brought about by manual adjustment of a restrictive valve, not shown, in device 30 and under control of the pilot. Device 30 may also have an automatic restrictive valve, not shown, operable in connection with air flow sensing elements 35 and 37 to reduce fuel flow under conditions of rarified atmosphere in order to regulate the effective fuel/air ratio of the turbine. Also device 30 may have an automatic restrictive valve, not shown, operable in connection with the temperature sensing device 39 to reduce fuel flow under conditions of relatively warmer atmosphere and ambient temperature in order to prevent the final gas temperature from varying with atmospheric conditions. As a result of reduced fuel flow in conduit 46 for any of the above reasons, pump means 50 will rapidly diminish the supply of fluid accumulated in intake 48 and the consequent reduction in pressure in conduit 48 will be communicated through bypass line 160 to regulating device 80. The decrease in internal pressure in the chamber occupied by resilient member 114 will be followed by a tendency for valve part 106 to move to the left and thus uncover more of each of the radiating openings 100 formed in the body part 104. The back pressures maintained in bypass conduits 74, 76, and 78 will accordingly drop and the amount of fluid bypassed will instantly tend to increase inasmuch as both the total flow to the nozzle will tend to increase and the ejected output of the nozzle will tend to decrease. The rate of flow of fluid in the bypass circuit will be stimulated and suitable compensation will thereby be made in the intake conduit 48 for properly supplying pump means 50.

Much the same results will follow if the pump 50 happens to speed up in place of the reduction of flow of metered fluid from metering device 30 and pump 50 can speed up for a variety of reasons. For instance, the pilot can nose the plane down while cruising and the entire rotating machinery including propeller 10 and pump 50 will naturally speed up temporarily. Another instance is when the pilot causes a change in the setting of speed governor 26 to a higher value whereupon the pitch controls 27 will act to flatten the blade 10 pitch and cause the propeller and other rotating machinery including pump 50 to speed up. If metering device 30, on the other hand, is operated such as to provide an accelerated rate of flow of fluid, an opposite result will be reached. That is to say, the ensuing accumulation of fluid in intake 48 for pump means 50 will reflect itself in movement of valving part 106 to the right in a reduction in bypass flow owing to an increase in back pressure in conduits 74, 76, and 78 and in a relatively reduced supplementation of flow going to pump means 50 from the bypass source 160. Bypass flow, of course, under these circumstances is of minor importance because the relatively large quantity of fresh fuel being introduced into the system will tend to kep the nozzles cool for proper burner operation. Much the same result will be reached as to reduced bypass flow, if the pump 50 is slowed down instead of a relatively high rate of flow being permitted by metering device 30.

It is to be appreciated that a steep pressure gradient at regulator 80 is maintained in order to protect the delicate mechanism of metering device 30. This is accomplished by the single movable valve part 106 which further serves the purpose, by minor movement, of readily compensating for a scarcity or an excess of bypass fluid in the supply 48 for pump means 50. Because of the simplicity of regulator 80 the device as a whole may be easily manufactured at relatively low cost.

It will be appreciated that while regulator 80 does in fact establish common communication between bypasses 74, 76, and 78, the common pressure has been reduced at that point to a value of roughly 25 p. s. i. Consequently, when any one of the nozzles becomes plugged, the tendency for the regulator 80 to feed that nozzle through the bypass conduit is eliminated because of the low pressure which exists in the regulator.

Variations within the spirit and scope of the said invention are equally comprehended by the foregoing description.

What is claimed is:

1. A fuel system comprising pump means having an intake and an outlet, a metering device connected to the intake of the pump means for providing a supply of fuel at predetermined rates of flow thereto, bypass nozzles connected to the pump outlet each having an ejection orifice and a bypass discharge mutually supplied thereby, means forming split paths for the return flow of fuel from the respective bypass discharges of the nozzles and having a common portion leading to the pump intake and pressure responsive means in the common portion of said fuel return paths for individually increasingly restricting the return flow of fuel in each of said split paths in response to increasing pressure in the pump intake.

2. A fuel system comprising pump means having an intake and an outlet, a metering device connected to the intake of the pump means for providing a supply of fuel at predetermined rates of flow thereto, bypass nozzles connected to the pump outlet each having an ejection orifice and a bypass discharge mutually supplied thereby, means forming split paths for the return flow of fuel from the respective bypass discharges of the nozzles to the pump intake, and means variably positionable to restrict said respective return flow fuel paths individually for effecting change in flow through said ejection orifices.

3. A fuel system comprising pump means having an intake and an outlet, a metering device connected to the intake of the pump means for providing a supply of fuel at predetermined rates of flow thereto, bypass nozzles connected to the pump outlet each having an ejection orifice and a bypass discharge mutually supplied thereby, means forming split paths for the return flow of fuel from the respective bypass discharges of the nozzles and having a common portion leading to the pump intake and automatic means in said common portion and positionable to restrict said respective return flow fuel paths individually for effecting change in flow through said ejection orifices and preventing direct communication between said split paths past said intervening common portion.

4. A fuel system having a plurality of orifice forming means of the ejection nozzle type, fuel pump means adapted to be connected to the orifice means for making available thereto a supply of fuel, conduit for connecting said pump means and orifice means, a plurality of bypass forming means corresponding to the plurality of orifice forming means leading from the conduit and having a bypass common means in which they merge for carrying back to the pump means a commingled portion of the output not to be made immediately available for consumption in the orifice means, and in combination therewith, means in the bypass common means forming an individual restriction for each one of said plurality of bypass means for regulating the rate of flow of the said commingled portion bypassed and controlling the fuel supply immediately available for consumption in the orifice means.

5. In a fuel circuit adapted to be provided with varying incoming quantities of supplied fuel and means immediately effective to circulate the fuel, a set of bypass type nozzles each formed with means defining a path for circulated fuel and an ejection orifice so associated therewith as to deliver the collective quantities of ejected fuel in correspondence with the magnitude of the back pressure in the circulated fuel path, means operable to form individual restrictions for the nozzles in the circulated fuel path effective to increase the respective back pressures thereof and fuel delivery by the collective ejection orifices, and means sensitive to increasingly varying incoming quantities of fuel for operating said restriction means to form greater restriction to the circulated fuel flow from the individual nozzles immediately to be re-circulated by said circulating means.

References Cited in the file of this patent

UNITED STATES PATENTS

| | | |
|---|---|---|
| 1,252,254 | Fisher | Jan. 1, 1918 |
| 1,824,952 | Graham et al. | Sept. 29, 1931 |
| 2,290,350 | Olches | July 21, 1942 |
| 2,523,214 | Ifield | Sept. 19, 1950 |
| 2,537,681 | Lawrence | Jan. 9, 1951 |
| 2,673,556 | Reggio | Mar. 30, 1954 |

FOREIGN PATENTS

| | | |
|---|---|---|
| 558,092 | Great Britain | Dec. 21, 1943 |
| 607,137 | Great Britain | Aug. 26, 1948 |
| 608,860 | Great Britain | Sept. 22, 1948 |
| 618,145 | Great Britain | Feb. 17, 1949 |